United States Patent Office 3,121,732
Patented Feb. 18, 1964

3,121,732
PROCESS FOR THE PREPARATION OF PROPIONITRILES CONTAINING A HINDERED PHENOLIC RESIDUE
Eric A. Meier, Jackson Heights, and Martin Dexter, White Plains, N.Y., assignors to Geigy Chemical Corporation, New York, N.Y., a corporation of Delaware
No Drawing. Filed Jan. 5, 1962, Ser. No. 164,620
7 Claims. (Cl. 260—465)

This invention relates to a novel and useful process for the preparation of certain β-(3,5-dialkyl-4-hydroxyphenyl)-propionitriles. In particular, the invention concerns the preparation of compounds of the Formula I:

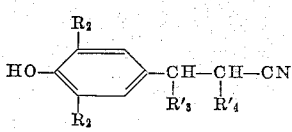

wherein
$R_1$ is a secondary or a tertiary alkyl group, preferably the tertiary (t or tert.) butyl group; other groups possible are e.g. secondary (sec.) or tert. alkyl groups such as the isopropyl group and sec. butyl groups or other sec. or tert. alkyl groups having from 4 to 24 carbon atoms: butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc.
$R_2$ is an alkyl group, preferably the tertiary butyl group; other groups possible are alkyl groups of 1 to 24 carbon atoms: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonoadecyl, eicosyl, heneicosyl, docosyl, tricosyl, tetracosyl, etc., and
$R'_3$ and $R'_4$ are each independently hydrogen or alkyl, the alkyl group being preferably lower alkyl, i.e. having 1 to 6 carbon atoms.

The β-(3,5-dialkyl-4-hydroxyphenyl)propionitriles of the Formula I are used as intermediates in the preparation of esters and amides which are valuable stabilizers for organic material subject to deterioration. Thus, the nitrile group in Formula I can be converted by conventional ways known to the art into the carboxylic acid group which may be in turn esterified to produce useful compounds for stabilization of lubricating oils, resins such as polypropylene, polyethylene, etc. The same nitrile group in Formula I can also be directly converted to the amide group by hydration catalytically by reacting the ester with an alkyl or dialkyl amine, the corresponding N-alkyl derivative is formed to yield useful compounds for stabilization of mineral oils, vegetable and animal oils, polymeric material, such as solid polypropylene, polyethylene, etc.

The following reactions illustrate the use of compounds of the Formula I as intermediates in the organic synthesis of useful stabilizers:

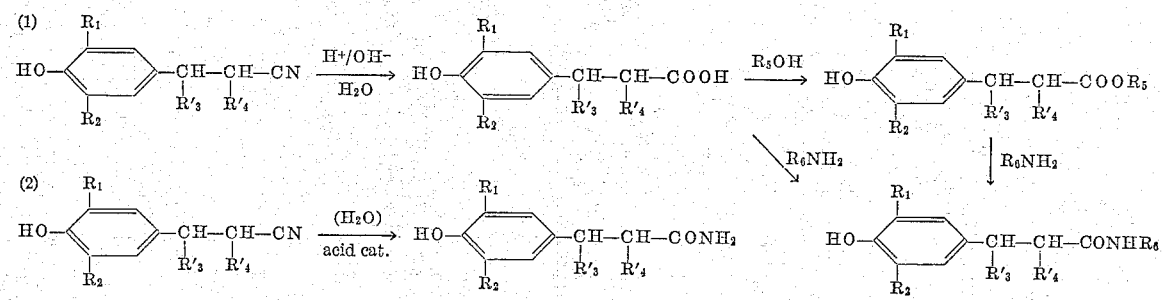

In the foregoing reactions (1) and (2), $R_1$, $R_2$, $R'_3$ and $R'_4$ are as defined hereinabove in Formula I; $R_5$ and $R_6$ may be an alkyl group, e.g. of 1 to 24 carbon atoms and X is halogen, e.g. Cl. If desired, the n-alkyl amide stabilizer end product can be obtained after hydrolysis of the nitrile of the Formula I, by reaction of the resultant acid with an appropriate N-alkyl amine. In this way, both symmetrical or unsymmetrical N,N-dialkyl amides are produced which are useful as stabilizers for unstable material such as mineral oil, polypropylene, etc. The following reaction illustrates the foregoing process of making N,N-dialkyl amide stabilizers having a hindered phenol group therein:

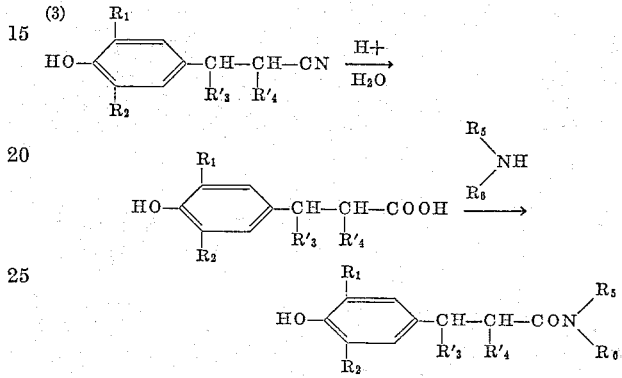

In reaction (3) $R_1$, $R_2$, $R'_3$, $R'_4$, $R_5$ and $R_6$ are as defined above.

Examples of compounds which are produced from the compounds of the Formula I and which are useful stabilizers for such unstable materials as mineral oil, polypropylene, etc. are: n-dodecyl β-(3,5-di-t-butyl-4-hydroxyphenyl)propionate, n-octadecyl β-(3,5-di-t-butyl-4-hydroxyphenyl)propionate, N-n-octadecyl β-(3,5-di-t-butyl-4-hydroxyphenyl)propionamide, and N,N-di-(n-dodecyl) β-(3,5-di-t-butyl-4-hydroxyphenyl)propionamide.

An object of this invention is to provide a novel chemical process for preparing the compounds of the Formula I. A further object is to provide a process which comprises reacting a 2,6-dialkyl phenol (such that at least one alkyl group is secondary or tertiary and bulky enough to hinder reaction of the phenolic hydroxyl group with the other reactant) said phenol to be reacted with an acrylonitrile in the presence of a base catalyst in a suitable solvent such as a difficulty esterifiable alcohol, to yield the desired propionitrile of the Formula I. Other objects of this invention will be apparent from the description and specification which follows.

It has now surprisingly been found that the above and other objects of the invention are realized by the process which comprises reacting a compound of the Formula II:

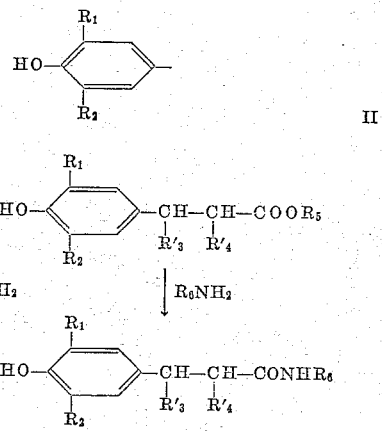

wherein $R_1$ and $R_2$ are defined as hereinabove, with a further compound of the Formula III:

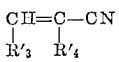
III wherein $R'_3$ and $R'_4$ are as defined hereinabove, said reacting to be carried out in the presence of a base catalyst such as alkali metal amides, e.g. sodamide, or alkali metal alkoxides or alkali metal hydroxides, e.g. potassium tertiary butoxide or potassium hydroxide, said compounds II and III and said base catalyst to be contacted in a suitable solvent which can be a difficulty esterifiable alcohol such as tertiary butanol, or an ether type solvent such as tetrahydrofuran, or an amide, e.g. dimethyl formamide.

Compounds of the Formula II are prepared in known ways, e.g. by alkylation of phenol or an o-alkyl phenol. Certain compounds of the Formula II are available commercially, e.g. 2,6-di-t-butylphenol. Examples of compounds of the Formula II which are also useful are: 6-t-butyl-o-cresol, 6-(1,1,3,3-tetramethylbutyl)-o-cresol, 2-sec-butyl-6-t-butylphenol, 2,6-bis(1,1-dimethyl-n-propyl)phenol, 2,6-bis(1-methyl-n-nonyl)phenol, 2-(1,1,3,3-tetramethyl-n-butyl)-6-methylphenol, etc.

Compounds of the Formula III such as acrylonitrile are available commercially; they are prepared according to the following reaction:

(4)   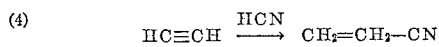

A wide range of temperatures from 25° C. at atmospheric pressure to 200° C. at superatmospheric pressures may be employed. The preferred range of temperatures is 40° to 110° C.

The process of the invention is preferably carried out at concentrations of 1:1 molar for the reactants, compounds II and III. Large excesses of the activated olefin (III) should be avoided in order to prevent side reaction of the product.

Any suitable catalyst concentrations of from 0.01 to 100 mole percent, based on the phenol (II) concentration may be employed, though preferred are mole percents of 5 to 25.

Suitable base catalysts include alkali metal amides, e.g. sodamide, or alkali metal alkoxides, e.g. sodium or potassium methoxide, ethoxide, propoxide, butoxide, sec. butoxide, t-butoxide, pentoxide, hexoxide, heptoxide, octyloxide, etc., or alkali metal hydroxides, e.g. sodium or potassium hydroxide. The alkaline earth metal alkoxides or hydroxides are also useful. Quaternary ammonium base catalysts are also useful, e.g. benzyltrimethylammonium hydroxide.

Examples of solvents which may be used in the reaction are difficultly esterifiable alkanols, such as tertiary butanol and other "lower" alkanols. ("Lower" alkanol is defined as an alkanol having up to 8 carbon atoms, preferably a tertiary alkanol). Other useful solvents include ethers, e.g. tetrahydrofuran, amides, e.g. dimethyl formamide, ketones, e.g. acetone etc.

Any suitable mode of addition may be employed although it has been found most practical to add the activated olefin (III) last to prevent its homopolymerization, particularly at elevated temperatures.

Optimum results are obtained when air or oxygen is excluded or substantially reduced in amount from the atmosphere immediately in contact with the reactants. This can be accomplished in various ways, e.g. by blanketing the reactants in the reaction vessel with an inert gas such as nitrogen. Alternatively, a reaction vessel is chosen whereby the reactants, etc. fill the reaction vessel almost completely. In a reaction in a closed vessel, air may be swept out with an inert gas such as nitrogen before introducing the reactants, etc. into the reaction vessel.

Although the general process of cyanoethylation of a hindered phenol is known in the art, up to now it has not been discovered that amount and choice of solvent plays such an important role in the realization of significantly higher yields of product (I), as well as in greater efficiency of operation. The process of the invention is a distinct improvement over the art since the reaction is carried out in a single step and does not require excess reactant olefin (III). Thus, the lower cost and ease of carrying out the reaction and higher yields attained are all advantages of the present improved process.

Preferred products produced according to the process of the invention are compounds of the Formula I(a):

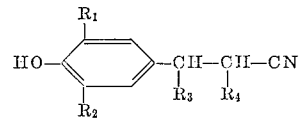
I(a)

wherein $R_1$ and $R_2$ are defined as hereinabove, and
$R_3$ and $R_4$ are independently hydrogen or methyl.

The products of the Formula I(a) are preferably produced by a process which comprises reacting a compound of the Formula II with a compound of the Formula III(a):

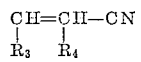

wherein $R_3$ and $R_4$ are defined as hereinabove, said reacting to be carried out in the presence of a base catalyst, such as an alkali metal alkoxide—preferably potassium tertiary butoxide—said reacting also to be effected in a homogeneous system comprising a tertiary alkanol, preferably tertiary butanol, and then recovering the product compound of the Formula I(a).

In another embodiment of the invention, the improved process comprises contacting the compound of the Formula II with a compound of the Formula III(a) in approximately equimolar amounts in the presence of a tertiary alkoxide alkali metal salt, preferably potassium tertiary butoxide, in a homogeneous system comprising the tertiary alkanol corresponding to the tertiary alkoxide salt catalyst, preferably tertiary butanol, said contacting to be effected at reflux temperature, and normal atmospheric pressure.

In a specific embodiment of the invention, the process for the production of β-(3,5-di-tertiary butyl-4-hydroxyphenyl) propionitrile comprises contacting 2,6-di-tert. butylphenol with acrylonitrile in tertiary butanol as solvent and in the presence of tertiary butoxide which has been formed in situ by dissolution of from 5 to 25 mole percent of potassium metal (based on the phenol) in said tertiary butanol, at reflux temperature for from about one quarter hour to about 24 hours, thereafter cooling the reaction mixture to about 25° C. and recovering the product β-(3,5-di-tertiary butyl-4-hydroxyphenyl) propionitrile.

In the following examples, parts are by weight unless otherwise indicated and the relationship between parts by weight and parts by volume is as that of grams to cubic centimeters; temperatures are in degrees centigrade.

*Example I.—Preparation of β(3,5-Di-Tertiarybutyl-4-Hydroxyphenyl) Propionitrile*

To a solution prepared by reaction of 2.1 parts of potassium metal with 500 parts by volume of dry tertiary butyl alcohol is added 37.2 parts of 2,6-di-tertiary butyl phenol and 16.2 parts of acrylonitrile rapidly in that order. The resulting solution is heated to reflux for eight hours, cooled and the excess solvent distilled off under reduced pressure. The reaction mass is then neutralized with very dilute hydrochloric acid and extracted two times with 200 parts by volume portions of ether. The combined ethereal extracts are extracted with water (two times 100 parts by volume) and then dried over anhydrous sodium sulfate. The ethereal solution is then concentrated on the steam bath and finally under vacuum to a final head temperature of 85° at 0.1 mm. of mercury. The residual mass crystallizes on standing and is recrystallized from hot heptane to yield β-(3,5-di-tertiary butyl-4-hydroxyphenyl)-propionitrile, a pale crystalline material M.P. 109.5–111° (uncorrected).

*Example II.—Preparation of α-Methyl-β-(3,5-Di-t-Butyl-4-Hydroxyphenyl)Propionitrile*

To a solution prepared by reaction of 2.1 parts of potassium metal with 500 parts by volume of dry tertiary butyl alcohol is added 37.2 parts of 2,6-di-t-butylphenol and 13.7 parts of α-methyl-acrylonitrile rapidly in that order. The resulting solution is heated to reflux for eight hours, cooled, and the excess solvent distilled off under reduced pressure. The reaction mass is then neutralized with very dilute hydrochloric acid and extracted two times with 200 parts by volume portions of ether. The combined ethereal extracts are extracted with water (two times 100 parts by volume) and then dried over anhydrous sodium sulfate. The ethereal solution is then concentrated on the steam bath and finally under vacuum. The residual product so obtained is α-methyl-β-(3,5-di-t-butyl-4-hydroxyphenyl) propionitrile.

If, in the foregoing Example II, instead of a α-methyl-acrylonitrile, β-methyl-acrylonitrile is employed, then β-methyl-β-(3,5-di-t-butyl-4-hydroxyphenyl) propionitrile is obtained.

What is claimed is:
1. Process for the production of compounds of the formula:

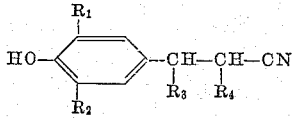

wherein
$R_1$ is a member selected from the group consisting of secondary alkyl groups and tertiary alkyl groups,
$R_2$ is an alkyl group, and
$R_3$ and $R_4$ are each independently selected from the group consisting of hydrogen and lower alkyl,
which process comprises reacting a compound of the formula:

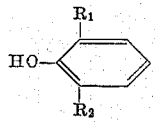

wherein $R_1$ and $R_2$ are defined as hereinabove, with a compound of the formula:

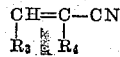

wherein $R_3$ and $R_4$ are as defined hereinabove, in the presence of from about 0.01 to about 100 mole percent of an alkali metal tertiary butoxide in tertiary butanol solvent at a reaction temperature from about 25° C. to about 200° C., the molar concentrations of phenol and nitrile reactants being about 1:1, said mole percent being based on the phenol reactant.

2. Process according to claim 9 for the production of compounds of the formula:

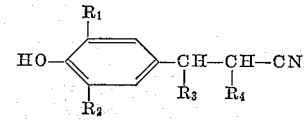

wherein
$R_1$ is a member selected from the group consisting of secondary alkyl groups and tertiary alkyl groups,
$R_2$ is an alkyl group,
$R_3$ and $R_4$ are each independently selected from the group consisting of hydrogen and lower alkyl,
which process comprises reacting a compound of the formula:

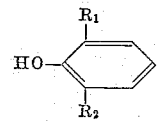

wherein $R_1$ and $R_2$ are as defined above, with a compound of the formula:

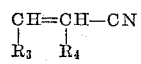

wherein $R_3$ and $R_4$ are as defined above, in the presence of a basic tertiary butoxide catalyst preformed in situ by dissolution of from about 5 to about 25 mole percent of alkali metal in sufficient quantity of the corresponding tertiary butanol to form a homogeneous reaction system, said mole percent being based on the phenol reactant.

3. The process according to claim 1, wherein said basic tertiary butoxide catalyst is potassium tertiary butoxide.

4. The process according to claim 1, wherein $R_1$ and $R_2$ are each tertiary butyl.

5. The process according to claim 1, wherein $R_3$ and $R_4$ are each hydrogen.

6. The process according to claim 1, wherein $R_3$ is hydrogen and $R_4$ is methyl.

7. The process according to claim 1, wherein $R_3$ is methyl and $R_4$ is hydrogen.

References Cited in the file of this patent
UNITED STATES PATENTS

| | | |
|---|---|---|
| 2,202,877 | Stevens | June 4, 1940 |
| 2,903,487 | Coffield | Sept. 8, 1959 |